United States Patent
Zimmerman et al.

(10) Patent No.: US 9,228,923 B2
(45) Date of Patent: *Jan. 5, 2016

(54) METHODS FOR AN EXHAUST FLUID SENSOR

(71) Applicant: Ford Global Technologies, LLC, Dearborn, MI (US)

(72) Inventors: Bret Alan Zimmerman, Grosse Pointe Farms, MI (US); John Paul Bogema, Flat Rock, MI (US); Timothy L. Jenkins, Detroit, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/963,131

(22) Filed: Aug. 9, 2013

(65) Prior Publication Data

US 2013/0327118 A1 Dec. 12, 2013

Related U.S. Application Data

(63) Continuation of application No. 13/308,015, filed on Nov. 30, 2011, now Pat. No. 8,505,371.

(51) Int. Cl.
| | |
|---|---|
| *G01M 15/10* | (2006.01) |
| *F01N 3/20* | (2006.01) |
| *F01N 11/00* | (2006.01) |
| *F02D 41/22* | (2006.01) |
| *F02D 41/04* | (2006.01) |
| *F02D 41/14* | (2006.01) |

(52) U.S. Cl.
CPC ............. *G01M 15/102* (2013.01); *F01N 3/208* (2013.01); *F01N 11/00* (2013.01); *F02D 41/222* (2013.01); *F01N 2550/05* (2013.01); *F01N 2610/1493* (2013.01); *F01N 2900/08* (2013.01); *F01N 2900/1818* (2013.01); *F02D 41/042* (2013.01); *F02D 2041/1468* (2013.01); *Y02T 10/24* (2013.01); *Y02T 10/40* (2013.01); *Y02T 10/47* (2013.01)

(58) Field of Classification Search
CPC ................ F01N 11/00; F01N 2550/05; F01N 2610/1493; F01N 2900/08; F01N 2900/1818; F01N 3/208; F01N 2041/1468; F01N 41/042; F01N 41/222; G01M 15/102; Y02T 10/24; Y02T 10/40; Y02T 10/47
USPC ....................................................... 73/114.69
See application file for complete search history.

(56) References Cited

U.S. PATENT DOCUMENTS

| | | | |
|---|---|---|---|
| 6,063,350 | A | 5/2000 | Tarabulski et al. |
| 7,610,750 | B2 | 11/2009 | Viola et al. |
| 7,617,672 | B2 | 11/2009 | Nishina et al. |
| 7,975,470 | B2 | 7/2011 | Hirata et al. |
| 7,987,661 | B2 | 8/2011 | Jung |
| 8,075,179 | B2 | 12/2011 | Barcin et al. |

(Continued)

*Primary Examiner* — Freddie Kirkland, III
(74) *Attorney, Agent, or Firm* — Julia Voutyras; Alleman Hall McCoy Russell & Tuttle LLP

(57) ABSTRACT

Various methods are provided for diagnosing an exhaust fluid sensor disposed in an exhaust fluid passage. By monitoring the sensor during conditions when it is in contact with the exhaust fluid and when it is not in contact with the exhaust fluid, an expected change in the sensor output can be monitored to identify whether the sensor is generating sufficiently accurate readings.

19 Claims, 6 Drawing Sheets

(56) References Cited

U.S. PATENT DOCUMENTS

| | | |
|---|---|---|
| 8,091,415 B2 | 1/2012 | Matsunaga et al. |
| 8,256,211 B2 | 9/2012 | Asaura et al. |
| 2003/0051468 A1 | 3/2003 | Van Nieuwstadt et al. |
| 2007/0113544 A1 | 5/2007 | Nishina et al. |
| 2007/0266703 A1 | 11/2007 | Hirata et al. |
| 2009/0288734 A1 | 11/2009 | Barcin et al. |
| 2010/0319651 A1 | 12/2010 | Kasahara |
| 2011/0107812 A1 | 5/2011 | Kasahara |

METHODS FOR AN EXHAUST FLUID SENSOR

CROSS REFERENCE TO RELATED APPLICATIONS

The present application is a continuation of U.S. patent application Ser. No. 13/308,015, filed Nov. 30, 2011, the entire contents of which are hereby incorporated by reference for all purposes.

TECHNICAL FIELD

The present application relates to methods for diagnosing an exhaust fluid sensor disposed in an exhaust fluid passage of an exhaust gas treatment system of an engine, such as an internal combustion engine.

BACKGROUND AND SUMMARY

Vehicle systems may include an engine with an exhaust gas treatment system coupled in its exhaust passage in order to control regulated emissions. In some examples, the exhaust gas treatment system may include a selective catalytic reduction (SCR) system in which an exhaust fluid, such as urea or ammonia, is added to the exhaust stream upstream of a catalyst such that $NO_x$ may be reduced by the catalyst. In such an example, the exhaust fluid may be delivered to the exhaust passage via an injector fluidically coupled to a pump by an exhaust fluid passage. An exhaust fluid sensor may be disposed in the exhaust fluid passage in order to determine the quality of the exhaust fluid for emission compliance, for example. Such a sensor may degrade over time, however, resulting in reduced reliability of the sensor output.

The inventors herein have recognized the above issue and have devised an approach to at least partly address it. In one example, a method includes indicating degradation of an exhaust fluid sensor positioned upstream of an exhaust injector based on a first reading when exhaust fluid is present at the sensor and a second reading after exhaust fluid is evacuated away from the sensor.

By obtaining a first reading and a second reading under different conditions, exhaust fluid sensor degradation may be diagnosed. For example, under the two different conditions, a different exhaust fluid reading is expected. Because exhaust fluid is present at the sensor when the first reading is obtained, such as when the engine is in operation, the first reading may have a higher value than the second reading which is obtained when exhaust fluid is not present at the sensor, such as after the engine is shutdown. Thus, degradation of the exhaust fluid sensor may be diagnosed based on the first exhaust fluid reading and the second exhaust fluid reading, and a vehicle operator may be notified of the degraded sensor and/or a diagnostic code may be set.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to various embodiments of methods a for a vehicle system which includes an exhaust fluid sensor. In one example embodiment, a method comprises indicating degradation of an exhaust fluid sensor positioned upstream of an exhaust injector based on a first exhaust fluid concentration when exhaust fluid is present at the sensor and a second exhaust fluid concentration after exhaust fluid is evacuated away from the sensor. The first exhaust fluid concentration may be determined when the engine is on and after an exhaust gas treatment system is started. The second exhaust fluid concentration may be determined when after the engine is shutdown and the exhaust gas treatment system is shutdown. By comparing the first exhaust fluid concentration and the second exhaust fluid concentration measured under different conditions, for example, degradation of the exhaust fluid sensor may be indicated. For example, the first exhaust fluid concentration may be expected to be higher than the second exhaust fluid concentration because is exhaust fluid is present only when the first exhaust fluid concentration is measured. In this way, degradation of the exhaust fluid sensor may be determined.

Figure 1:
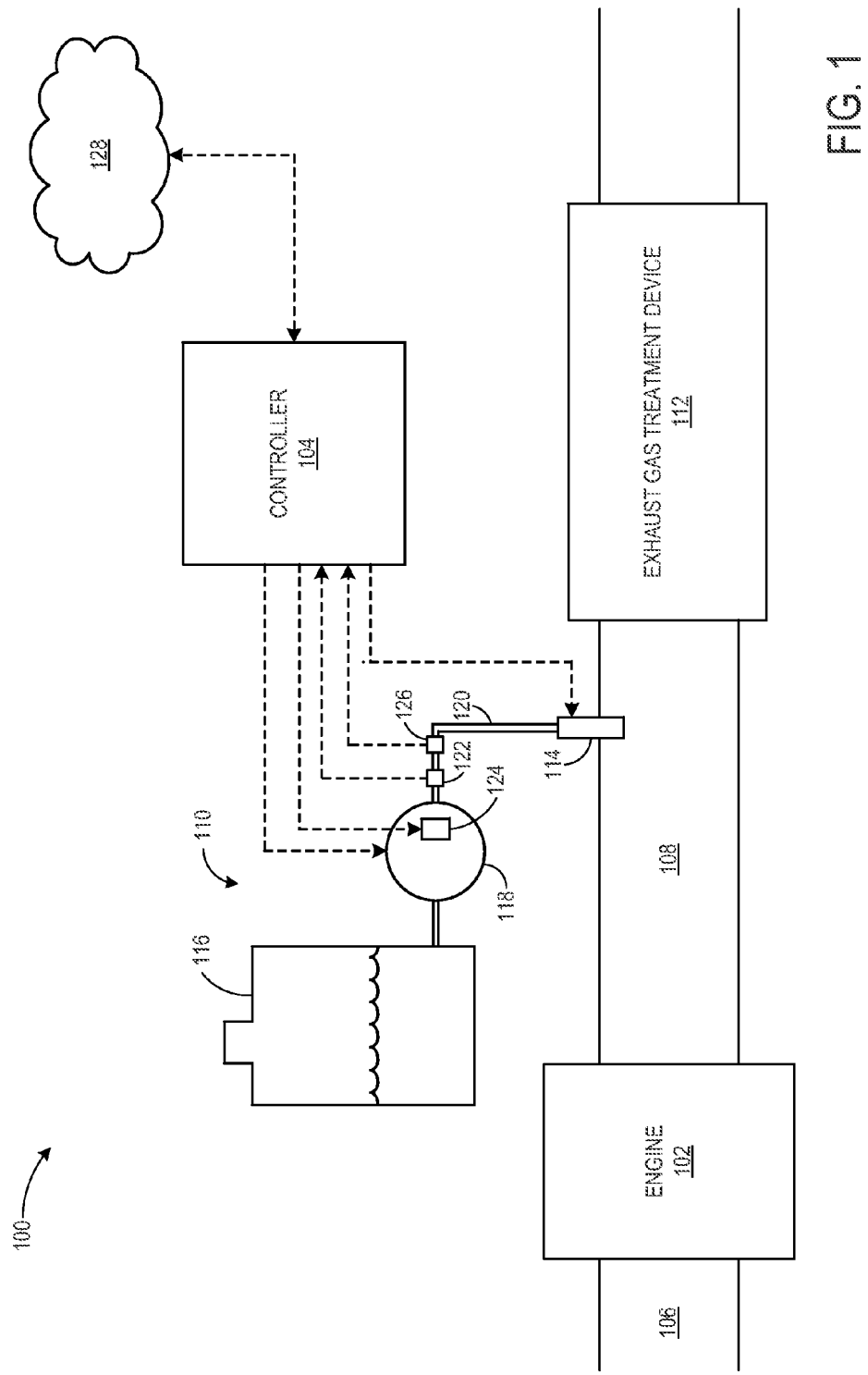
FIG. 1 shows a schematic diagram of an engine system including an exhaust gas treatment system.

FIG. 1 shows a schematic diagram of engine system 100. Engine system 100 includes engine 102 which may be included in a propulsion system of a vehicle. Engine 102 may be controlled at least partially by a control system including controller 104 and by input from a vehicle operator via an input device (not shown). Intake air is inducted into engine 102 via intake passage 106, an exhaust gas resulting from combustion in engine 102 is exhausted via exhaust passage 108 eventually leading to a tailpipe (not shown) that eventually routes exhaust gas to the atmosphere.

As shown, exhaust gas treatment system 110 including exhaust gas treatment device 112 is shown arranged along exhaust passage 108. In the example embodiment of FIG. 1, exhaust gas treatment device 112 may be a selective catalyst reduction (SCR) system, for example. In other examples, exhaust gas treatment system 110 may additionally or alternatively include a three way catalyst (TWC), a $NO_x$ trap, various other emission control devices, or combinations thereof. Further, as depicted, exhaust fluid injector 114 is disposed upstream of exhaust gas treatment device 112. Exhaust fluid injector 114 injects an exhaust fluid into the exhaust stream for reaction with $NO_x$ in exhaust gas treatment device 112 responsive to signals received from controller 104. The exhaust fluid may be a reductant, for example, such as urea or ammonia.

In the example depicted in FIG. 1, exhaust fluid injector 114 is supplied with exhaust fluid from exhaust fluid storage tank 116. Exhaust fluid storage tank 116 may be a reservoir suitable for holding the exhaust fluid throughout a range of temperatures, for example. The exhaust fluid is pumped from exhaust fluid storage tank 116 via pump 118. Pump 118 pumps exhaust fluid from exhaust fluid storage tank 116 and delivers the exhaust fluid to exhaust fluid passage 120 at a higher pressure. A pressure in exhaust fluid passage 120 may be measured by pressure sensor 122, for example, disposed in exhaust fluid passage 120. As shown, exhaust fluid passage 120 fluidically couples pump 118 and injector 114. Further, reverting valve 124 is mechanically coupled to pump 118 such that a flow of fluid through the pump may be reversed. As an example, it may be desired to reverse the flow through the pump after engine shutdown such that exhaust fluid passage 120 may be drained of exhaust fluid.

A concentration of the exhaust fluid which passes through exhaust fluid passage 180 may be determined via exhaust fluid sensor 126, which is positioned upstream of injector 114. For example, the concentration of the exhaust fluid may be determined so that it may be determined whether or not the exhaust fluid storage tank is holding the correct fluid or fluid mixture. Thus, the exhaust fluid sensor may output a first reading indicating a first exhaust fluid concentration during engine operation when the exhaust fluid line is full and exhaust fluid is present at the exhaust fluid sensor. The exhaust fluid sensor may further output a second reading indicating a second exhaust fluid concentration after engine shutdown when the exhaust fluid line is empty and exhaust fluid is not present at the sensor. The first reading may be compared to the second reading in order to test the functionality of the exhaust fluid sensor, for example, as will be described in greater detail below with reference to FIGS. 2-5.

Controller 104 may be a microcomputer including the following, although not shown in FIG. 1: a microprocessor unit, input/output ports, an electronic storage medium for executable programs and calibration values (e.g., a read only memory chip), random access memory, keep alive memory, and a data bus. Storage medium read-only memory may be programmed with computer readable data representing instructions executable by the microprocessor for performing the methods described below as well as other variants that are anticipated but not specifically listed. For example, the controller may receive communication (e.g., input data) from the various sensors, process the input data, and trigger the actuators in response to the processed input data based on instruction or code programmed therein corresponding to one or more routines. Example routines are described herein with reference to FIGS. 2-5.

Controller 104 sends signals to communications system 128, such as a wireless network or controller area network (CAN). As an example, after processing data from exhaust fluid sensor 126 and determining that exhaust fluid sensor 126 is degraded, controller 104 send may set a fault code and send a message to communications system 128 indicating degradation of exhaust fluid sensor 126. Communications system 128 may then notify the operator of the vehicle via an operator interface, such as a dashboard or other vehicle display, for example. In some examples, communications system 128 may additionally or alternatively send a message to a third party 130, such a selling dealership of the vehicle or another service center.

Thus, the vehicle system includes an exhaust gas treatment system which includes an exhaust fluid sensor. The exhaust fluid sensor measures an exhaust fluid concentration and sends a signal to the controller indicating the concentration. As will be described below, based on the exhaust fluid readings, degradation of the exhaust fluid sensor may be determined.

Figure 2:
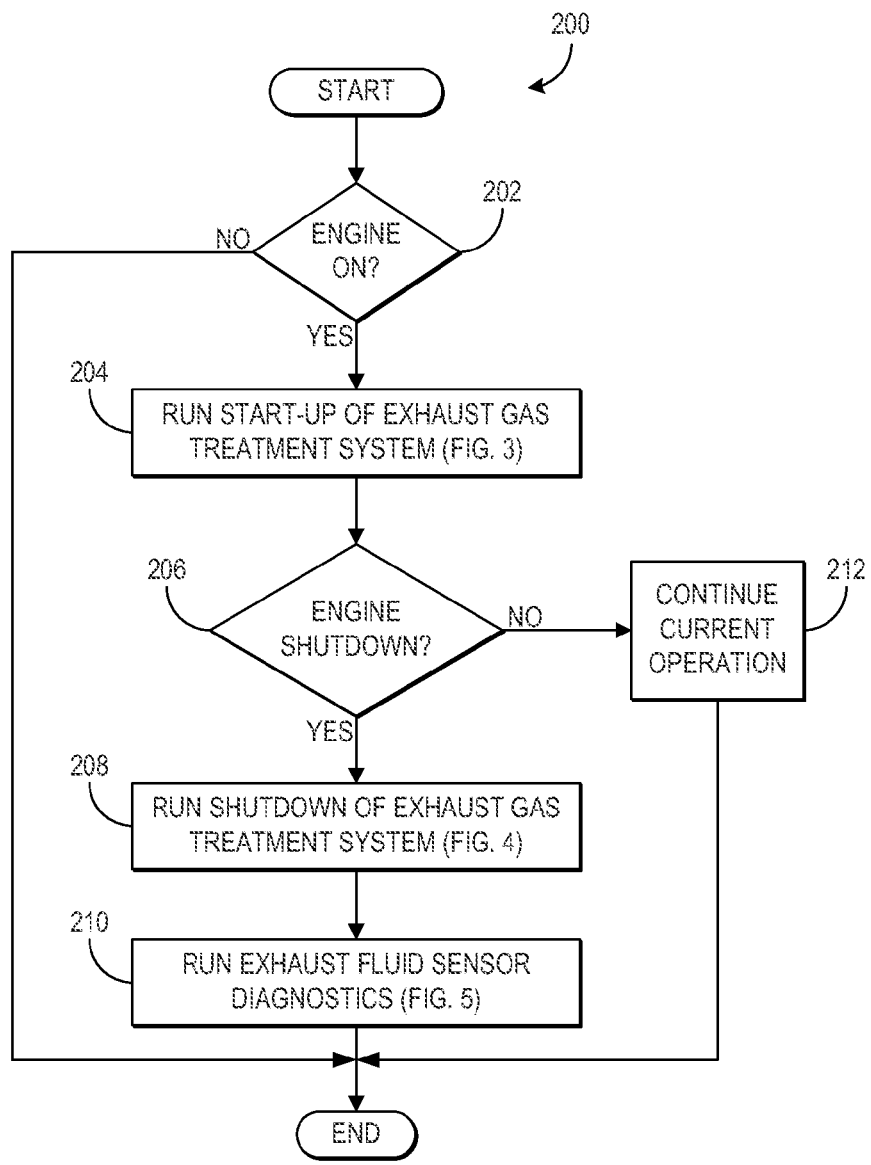
FIG. 2 shows a flow chart illustrating a routine for an engine system.
Figure 3:
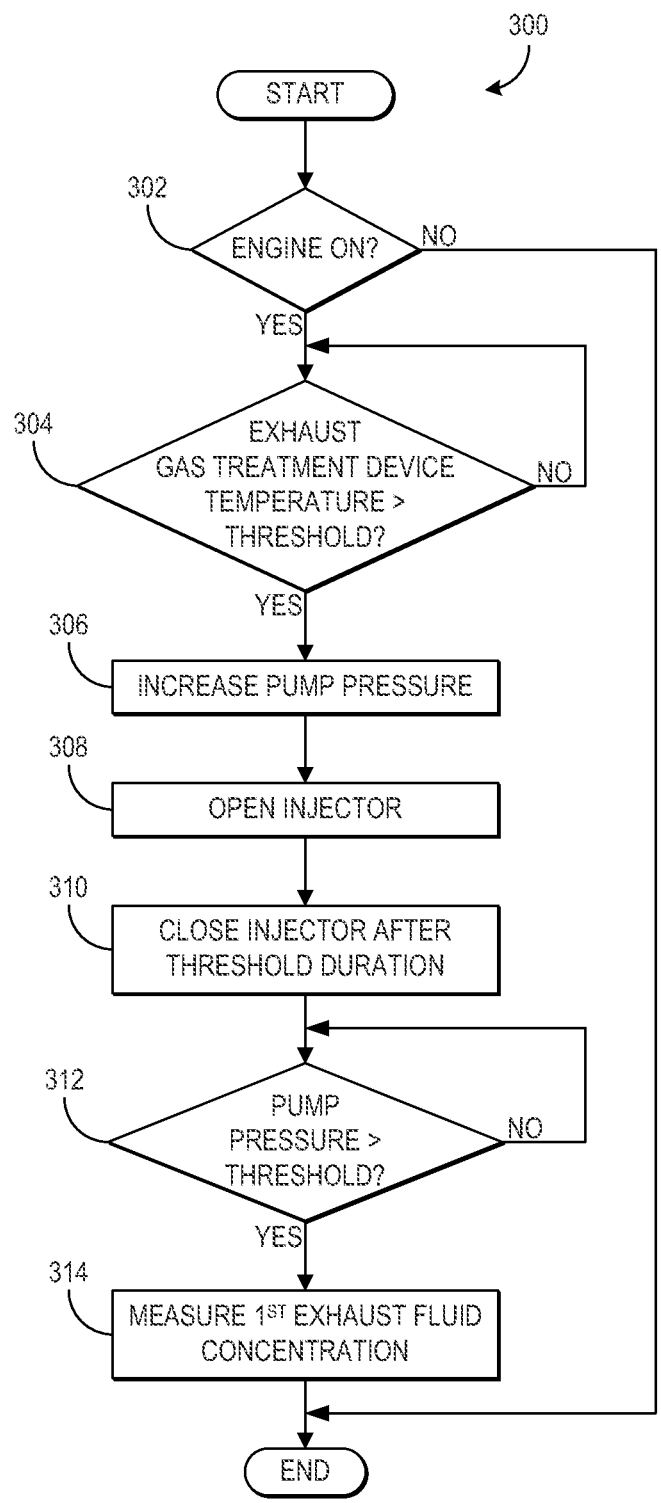
FIG. 3 shows a flow chart illustrating a routine for estimating a first exhaust fluid concentration.
Figure 4:
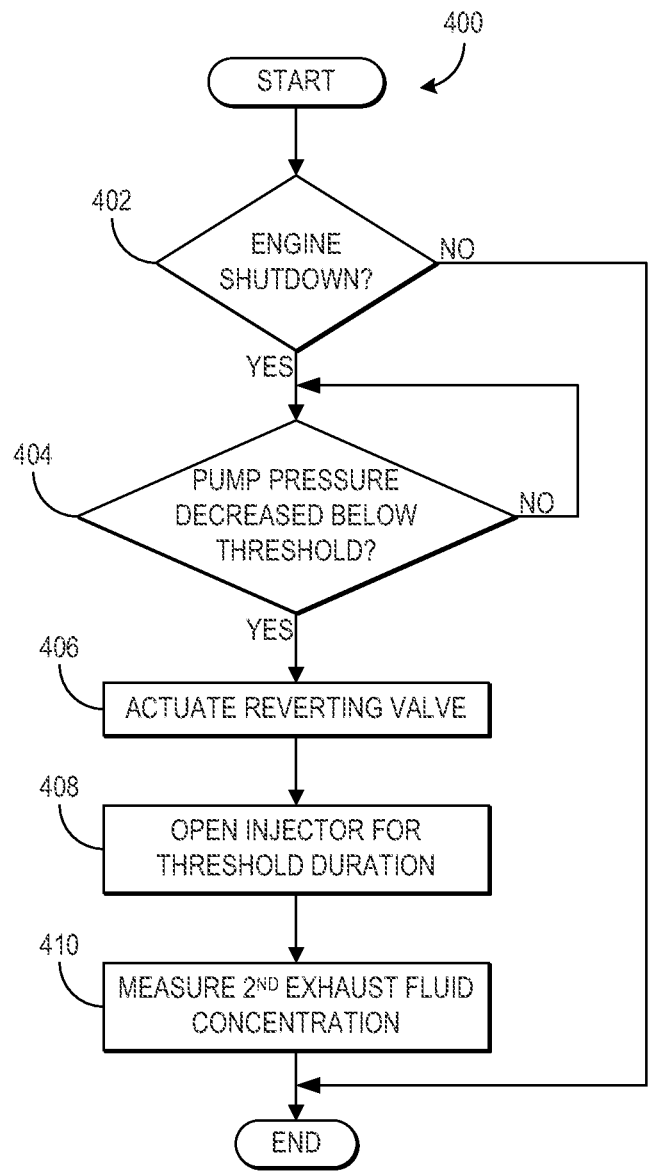
FIG. 4 shows a flow chart illustrating a routine for estimating a second exhaust fluid concentration.
Figure 5:
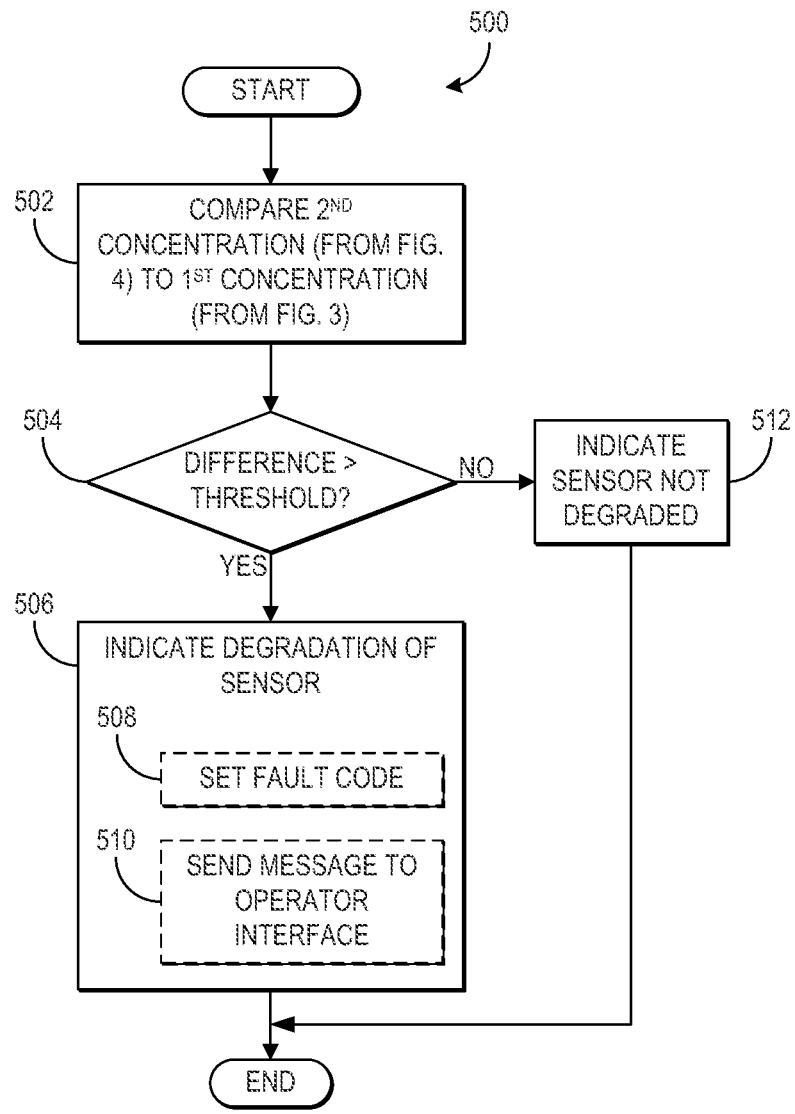
FIG. 5 shows a flow chart illustrating a routine for diagnosing an exhaust fluid sensor.
Figure 6:
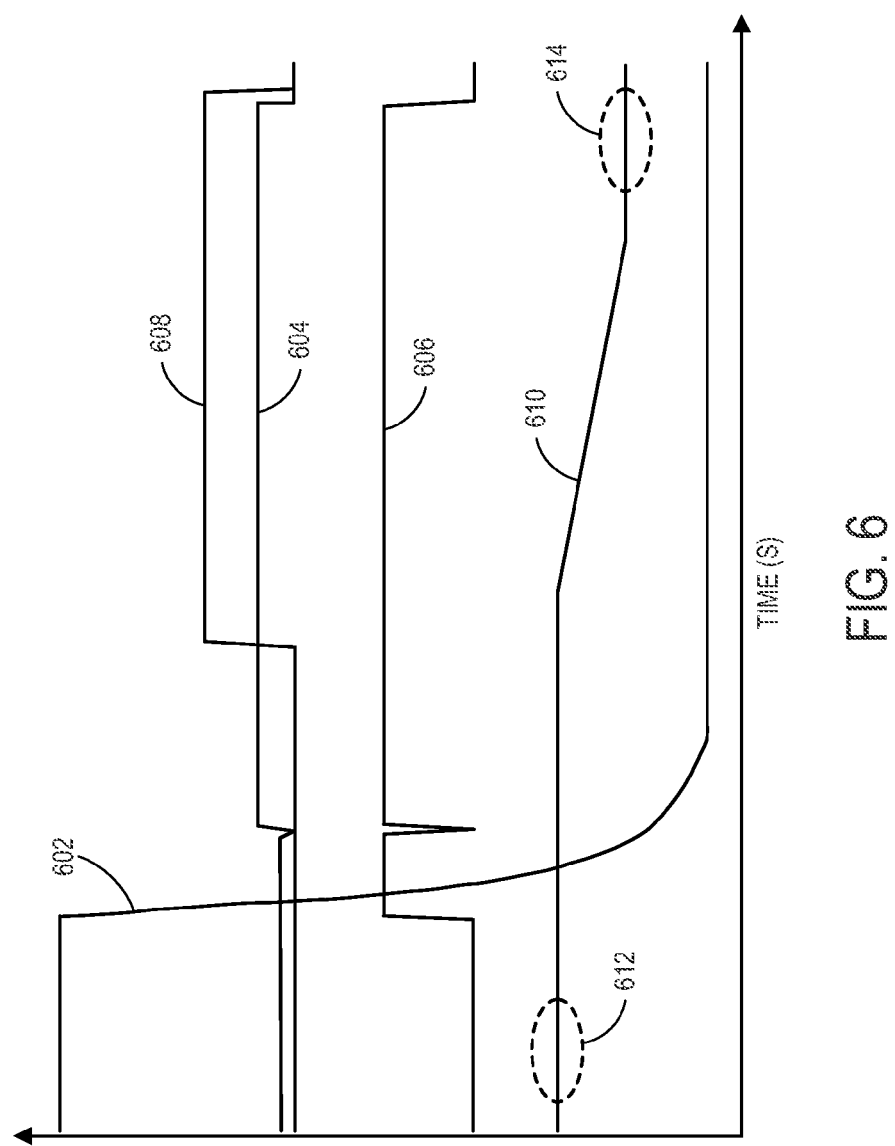
FIG. 6 shows a graph illustrating various parameters of the exhaust gas treatment system over time.

FIGS. 2-5 show flow charts illustrating routines for an engine system, such as engine system 100 described above with reference to FIG. 1. Specifically, FIG. 2 shows a routine for controlling start-up and shutdown of an exhaust gas treatment system which includes an exhaust fluid sensor. FIG. 3 shows a routine for starting-up an exhaust gas treatment system while the engine is on and measuring a first exhaust fluid concentration. FIG. 4 shows a routine for shutting down the exhaust gas treatment system after the engine is shutdown and measuring a second exhaust fluid concentration. FIG. 5 shows a routine for diagnosing the exhaust fluid sensor based on the first and second exhaust fluid concentrations. Further, FIG. 6 shows a graph illustrating various parameters of the exhaust gas treatment system while the exhaust gas treatment system is shutting down.

FIG. 2 shows a flow chart illustrating routine 200 for controlling start-up and shutdown an exhaust gas treatment system which includes an exhaust fluid sensor, such as exhaust gas treatment system 110 described above with reference to FIG. 1. Specifically, the routine determines when to run start-up and shutdown of the exhaust gas treatment system based on whether the engine is running.

At 202 of routine 200, it is determined if the engine is on. As an example, it may be determined if the engine is on if the engine is spinning. Further, it maybe determined if the engine was recently started. For example, it may be determined if the coolant temperature is less than a threshold temperature or if a time since engine start is less than a threshold. If it is determined that the engine is not on, the routine ends.

On the other hand, if it is determined that the engine is on, the routine proceeds to 204 where start-up of the exhaust gas treatment system is carried out according to routine 300 of FIG. 3. As will be described in greater detail below, once the exhaust gas treatment system is operation, a first exhaust fluid reading may be determined.

At 206 of routine 200, it is determined if the engine is shutdown. As an example, it may be determined if the engine is not spinning. Further, it may be determined if the engine was recently shutdown. For example, it may be determined if the coolant temperature is greater than a threshold temperature or if the time since engine shutdown is less than a threshold. If it is determined that the engine is still on, the routine moves to 212 and current operation is continued.

On the other hand, if it is determined that the engine is off (e.g., shutdown), routine 200 continues to 208 where shutdown of the exhaust gas treatment system is carried out according to routine 400 of FIG. 4. As will be described in greater detail below, once the exhaust gas treatment system is shutdown, a second exhaust fluid reading may be determined.

At 210 of routine 200, exhaust gas fluid sensor diagnostics are carried out according to routine 500 of FIG. 5. As will be described in greater detail below, the first exhaust fluid reading determined in routine 300 and the second exhaust fluid reading determined in routine 400 are compared such that degradation of the exhaust fluid sensor may be determined.

Continuing to FIG. 3, a flow chart illustrating routine 300 for estimating a first exhaust fluid concentration during engine operation is shown. Specifically, the routine starts-up the exhaust gas treatment system measures the second exhaust fluid concentration via an exhaust fluid sensor disposed in an exhaust fluid passage once the exhaust gas treatment system is in operation.

At 302 of routine 300, it is determined if the engine is on. As an example, it may be determined if the engine is on if the engine is spinning. Further, it maybe determined if the engine was recently started. For example, it may be determined if the coolant temperature is less than a threshold temperature or if a time since engine start is less than a threshold. If it is determined that the engine is not on, the routine ends.

At 304, it is determined if a temperature of an exhaust gas treatment device of the exhaust gas treatment system is greater than a threshold temperature. For example, the exhaust gas treatment device may need to be to have warmed-up to a certain temperature (e.g., the threshold temperature) before exhaust fluid is injected in the exhaust passage upstream of the exhaust gas treatment device in order to reduce a possibility of degradation of the exhaust gas treatment device. If it is determined that the temperature of the exhaust gas treatment device is less than the threshold temperature, the routine waits to proceed until the temperature has reached the threshold temperature.

Once it is determined that the exhaust gas treatment device temperature is greater than the threshold temperature, routine 300 continues to 306 where the pump pressure is increased. For example, the controller may turn the pump on or increase a voltage supplied to the pump to increase the pump pressure. By increasing the pump pressure, an amount of exhaust fluid drawn from the exhaust fluid storage tank and supplied to the exhaust fluid passage may be increased, thereby increasing a pressure in the exhaust fluid passage.

At 308, the injector is opened. The injector may be opened such that the system fills with the exhaust fluid, for example, and air bubbles are cleared from the exhaust fluid passage. Once the injector has been opened for a threshold duration, the injector is closed at 310. Once the injector is closed, pressure may build in the exhaust fluid passage so that the injector is ready to inject the exhaust fluid into the exhaust passage at a desired pressure when exhaust fluid injection is requested. Thus, at 312, it is determined if the pump pressure is greater than a threshold pressure. The threshold pressure may be a desired pressure at which to inject exhaust fluid into the exhaust passage, for example. If the pump pressure is not greater than the threshold pressure, the system waits to proceed until the pump pressure reaches the threshold pressure.

Once it is determined that the pump pressure is greater than the threshold pressure, routine 300 continues to 314 where a first exhaust fluid concentration is determined. Thus, the first exhaust fluid concentration is measured when the exhaust fluid passage is filled with exhaust fluid and the system is ready to inject exhaust fluid into the exhaust passage. As such, a possibility that air bubbles might be in the exhaust fluid passage and affect the exhaust fluid concentration measurement is decreased. The first exhaust fluid reading may be obtained via exhaust fluid sensor 126 described above with reference to FIG. 1, for example. The first exhaust fluid concentration may correspond to an amount of urea or ammonia in the exhaust fluid mixture. For example, the urea may be aqueous urea which contains water. By determining the exhaust fluid concentration when the exhaust fluid passage is full and the exhaust gas treatment system is ready for operation, a vehicle operator and/or third party may be notified if the exhaust fluid concentration is too high or too low and the exhaust fluid is not suitable for use in the exhaust gas treatment system, for example.

Further, in some embodiments, the routine may further include adjusting an exhaust fluid injection to the exhaust passage based on the first exhaust concentration reading obtained when exhaust fluid is present at the exhaust fluid sensor. For example, if the measured concentration of the exhaust fluid is less than expected, a greater amount of exhaust fluid may be injected to the exhaust passage such that a desired amount of exhaust fluid is received by the catalyst. As another example, if the measured concentration of the exhaust fluid is greater than expected, a lesser amount of exhaust fluid may be injected to the exhaust passage such that a desired amount of exhaust fluid is delivered to the catalyst.

Thus, after start-up of the exhaust gas treatment system during engine operation, a first exhaust fluid concentration may be determined. The first exhaust fluid concentration corresponds to an exhaust fluid reading when the exhaust fluid passage is full and there is exhaust fluid present at the exhaust fluid sensor. As such, the first exhaust fluid concentration may be measured at any time while the engine is on and after the exhaust gas treatment system has been started-up and is in operation. The first exhaust fluid reading may indicate whether a suitable exhaust fluid is being used by the exhaust gas treatment system, for example. Further, as will be described below, the first exhaust fluid concentration may be compared to a second exhaust fluid concentration to diagnose the exhaust fluid sensor.

FIG. 4 shows a flow chart illustrating routine 400 for estimating a second exhaust fluid concentration after engine shutdown. Specifically, the routine shuts down the exhaust gas treatment system after engine shutdown and evacuates exhaust fluid from an exhaust fluid passage in which an exhaust fluid sensor is disposed. For example, exhaust fluid may be drained from a pump, exhaust fluid passage, and injector of the system after engine shutdown such that degradation of the system due to freezing, corrosion, or the like is reduced during while the engine is off. Once the exhaust fluid is drained from the exhaust fluid passage, a second exhaust fluid concentration is determined.

At 402 of routine 400, it is determined if the engine is shutdown. As an example, it may be determined if the engine is not spinning. Further, it may be determined if the engine was recently shutdown. For example, it may be determined if the coolant temperature is greater than a threshold temperature or if the time since engine shutdown is less than a threshold. If it is determined that the engine is still on, the routine ends.

On the other hand, it if is determined that the engine is shutdown, routine 400 continues to 404 where it is determined if the pump pressure has decreased below a threshold pressure. For example, the pressure in the system may be decreased such that the system may be shutdown and the flow of exhaust fluid from the exhaust fluid storage tank may be reduced. As an example, curve 602 in FIG. 6 shows the pump pressure over time after an engine shutdown. Although the pump pressure is decreased, the pump may remain on. For example, curve 604 of FIG. 6 shows pump DC. If it is determined that the pump pressure is not less than the threshold pressure, routine 400 of FIG. 4 waits until the pump pressure has decreased below the threshold pressure before proceeding.

Once it is determined that the pump pressure is below the threshold pressure, a reverting valve is actuated. The reverting valve may be actuated such that a flow through the pump may be reversed, for example. Actuation of the reverting valve is depicted by curve 606 in FIG. 6, for example. In this manner, exhaust fluid that is in the pump may be sent back to the exhaust fluid storage tank and, additionally, exhaust fluid may be drained from the exhaust fluid passage via the pump. Further, once the reverting valve is actuated, the injector is opened for a threshold duration. Curve 608 in FIG. 6 shows the opening of the injector after the pump pressure has decreased. As such, some exhaust fluid may be evacuated from the exhaust fluid passage via the injector and a pressure in the exhaust fluid passage may be further reduced.

Once the injector has been closed, routine 400 proceeds to 410 and a second exhaust fluid concentration is determined. Thus, the second exhaust fluid concentration is measured after the exhaust fluid has been evacuated from the exhaust fluid passage and exhaust fluid is not present at the exhaust fluid sensor. As such, the second exhaust fluid reading may correspond to a concentration of a component of the exhaust fluid mixture, such as urea or ammonia, in air or exhaust gas.

The second exhaust fluid reading may be obtained via exhaust fluid sensor 126 described above with reference to FIG. 1, for example. In some examples, the second exhaust fluid concentration may be measured to determined if exhaust fluid has been evacuated from the exhaust fluid passage, for example. An amount of fluid injected to the exhaust passage may not be adjusted responsive to the measured second exhaust concentration, however. For example, the second exhaust concentration is obtained when exhaust fluid is not present at the sensor and is not representative of the exhaust fluid concentration when exhaust fluid is present at the sensor and ready for delivery to the exhaust passage.

In some embodiments, the second exhaust fluid concentration may be determined immediately subsequent an engine key-on, or other start request (such as key-less entry and/or key-less push-button start), before the exhaust gas treatment system is pressurized. For example, the second exhaust fluid concentration may be determined at engine key-on if the time the engine has been shutdown (e.g., key-off) or soak time is greater than a threshold duration. In such an embodiment, the exhaust fluid passage may still be drained and exhaust fluid is not present at the sensor, as the system has not yet pressurized the exhaust fluid in the exhaust gas treatment system.

Thus, after the engine is shutdown and exhaust fluid is drained from the exhaust fluid passage, pump, and injector, a second exhaust fluid concentration may be determined. The second exhaust fluid concentration corresponds to an exhaust fluid reading when the exhaust fluid passage is empty and there is not exhaust fluid present at the exhaust fluid sensor. The second exhaust fluid reading may indicate whether the exhaust fluid has actually drained from the exhaust fluid passage, for example. Further, as will be described below, the second exhaust fluid concentration may be compared to the first exhaust fluid concentration to diagnose the exhaust fluid sensor.

FIG. 5 shows a flow chart illustrating routine 500 for diagnosing an exhaust fluid sensor, such as exhaust fluid sensor 126 described above with reference to FIG. 1. Specifically, the routine indicates degradation of the exhaust fluid sensor based on a first exhaust fluid concentration obtained when an exhaust fluid passage between a pump and an injector is full (e.g., the first exhaust fluid concentration determined in routine 300) relative to a second exhaust fluid concentration obtained after the exhaust fluid passage is has been cleared of exhaust fluid (e.g., the second exhaust fluid concentration determined in routine 400).

At 502 of routine 500, the second exhaust fluid concentration is compared to the first exhaust fluid concentration. For example, the controller may determine a difference between the first exhaust fluid concentration and the second exhaust fluid concentration. Curve 612 in FIG. 6 shows an exhaust fluid concentration signal. As depicted, when the pump pressure is high before the reverting valve is actuated and the injector is opened (e.g., when the engine is on), the exhaust fluid concentration signal has a higher value than after the pump pressure has decreased, the pump direction has been reversed by actuation of the reverting valve, and the injector has been opened (e.g., after engine shutdown). This is because there is exhaust fluid present in the exhaust fluid passage when the first reading is obtained and there is no exhaust fluid present in the exhaust fluid passage when the second reading is obtained, for example. Area 612 in FIG. 6 shows a time when the first exhaust fluid concentration may be determined and area 614 in FIG. 6 shows a time when the second exhaust fluid concentration may be determined.

Thus, at 504 of routine 500 it is determined if the difference between the first exhaust fluid concentration and the second exhaust fluid concentration is greater than a threshold difference. As an example, the threshold difference may be the difference between a minimum exhaust fluid concentration during engine operation and a concentration of an exhaust fluid component in air or exhaust gas. If it is determined that the difference is not greater than a threshold difference, the routine moves to 512 and it is indicated that the sensor is not degraded.

On the other hand, if the difference between the first exhaust fluid concentration and the second exhaust fluid concentration is greater than the threshold difference, routine 500 proceeds to 506 and degradation of the exhaust fluid sensor is indicated. Indicating degradation of the exhaust fluid sensor may include setting a fault code in the controller at 508. Further, indicating degradation of the controller may additionally or alternatively include sending a message to an operator interface at 510. For example, the vehicle operator may be notified that the exhaust fluid sensor is degraded via a message or indicator lamp on a vehicle display such as a dashboard. As another example, a third party, such as a vehicle service center, may be notified of the degraded exhaust fluid sensor such that the third party may inform the vehicle operator to bring the vehicle in for service.

Thus, by comparing a first exhaust fluid concentration sensed while the engine is on and there is exhaust fluid present at the exhaust fluid sensor and a second exhaust fluid concentration sensed after the engine is shutdown and there is not exhaust fluid present at the exhaust fluid sensor, degradation of the exhaust fluid sensor may be determined. The vehicle operator may be notified of the degraded sensor via the vehicle interface, for example, and the vehicle may be taken to a service center such that the exhaust fluid sensor may be replaced or repaired.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method, comprising:
    indicating degradation of an exhaust fluid sensor positioned upstream of an exhaust injector of a V-engine based on a first reading when exhaust fluid is present at the sensor and a second reading after exhaust fluid is drawn away from the sensor by opening the exhaust injector after engine shutdown and reversing a pump direction to clear an exhaust fluid passage in which the sensor is positioned.

2. The method of claim 1, wherein the exhaust fluid is evacuated away from the sensor after engine shutdown.

3. The method of claim 1, wherein the exhaust fluid passage is coupled between a pump and the injector.

4. The method of claim 3, wherein the first reading is obtained during engine running after pressurizing the exhaust fluid passage by operating the pump with the injector closed.

5. The method of claim 1, further including adjusting an exhaust fluid injection amount based on the first reading when the exhaust fluid is present at the sensor.

6. The method of claim 1, wherein the indication includes setting a fault code in a controller and sending a message to an operator interface in a vehicle in which the sensor is disposed.

7. The method of claim 1, wherein the exhaust fluid is aqueous urea.

8. A method for diagnosing an exhaust fluid sensor, comprising:
    sensing a first exhaust fluid concentration in an exhaust fluid passage of an engine of a vehicle between a pump and an injector;
    responsive to a decrease in pump pressure, actuating a reverting valve to reverse pump flow, opening an exhaust injector for a threshold duration, and sensing a second exhaust fluid concentration in the exhaust fluid passage; and
    indicating degradation of the exhaust fluid sensor based on a difference between the first exhaust fluid concentration and the second exhaust fluid concentration.

9. The method of claim 8, wherein the first exhaust fluid concentration is sensed when exhaust fluid is present in the exhaust fluid passage at the exhaust fluid sensor.

10. The method of claim 8, wherein the second exhaust fluid concentration is sensed after exhaust fluid is evacuated away from the exhaust fluid sensor.

11. The method of claim 8, wherein indicating degradation of the exhaust fluid sensor includes setting a fault code in a controller in communication with the exhaust fluid sensor.

12. The method of claim 8, further comprising adjusting an exhaust fluid injection amount based on the first exhaust fluid concentration, and not adjusting the exhaust fluid injection amount based on the second exhaust fluid concentration.

13. The method of claim 8, wherein the first exhaust fluid concentration is sensed during engine running and the second exhaust fluid concentration is sensed after engine shutdown.

14. The method of claim 8, wherein the second exhaust fluid concentration is sensed after an engine start request when exhaust fluid is not present at the exhaust fluid sensor.

15. A method for diagnosing an exhaust fluid sensor, comprising:
    indicating degradation of the exhaust fluid sensor based on a first exhaust fluid concentration obtained when an exhaust fluid passage between a pump and an injector is full relative to a second exhaust fluid concentration obtained when the exhaust fluid passage is empty; and
    increasing a pump pressure and closing the injector after the injector is open for a threshold duration to fill the exhaust fluid passage.

16. The method of claim 15, wherein indicating degradation of the exhaust fluid sensor includes sending a message to an operator interface in a vehicle in which the exhaust fluid sensor is positioned.

17. The method of claim 15, further comprising adjusting an amount of exhaust fluid injected to an exhaust passage by the injector responsive to the first exhaust fluid concentration.

18. The method of claim 15, further comprising decreasing a pump pressure, actuating a reverting valve to reverse pump flow, and opening the injector for a threshold duration to empty the exhaust fluid passage.

19. The method of claim 15, wherein the first exhaust fluid concentration is obtained during engine running and the second exhaust fluid concentration is obtained after engine shutdown.

* * * * *